May 22, 1956     C. W. McCUTCHEN     2,746,765
SUSPENSION SYSTEMS FOR MOTOR ROAD VEHICLES
Filed Dec. 8, 1954
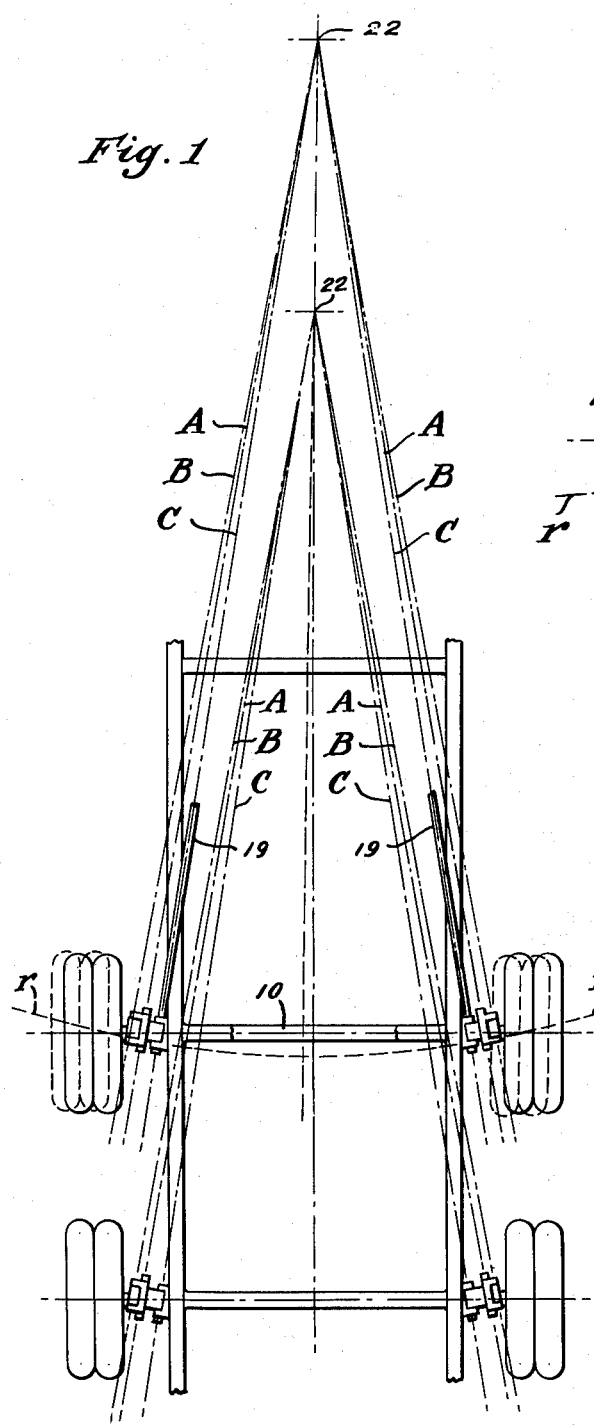
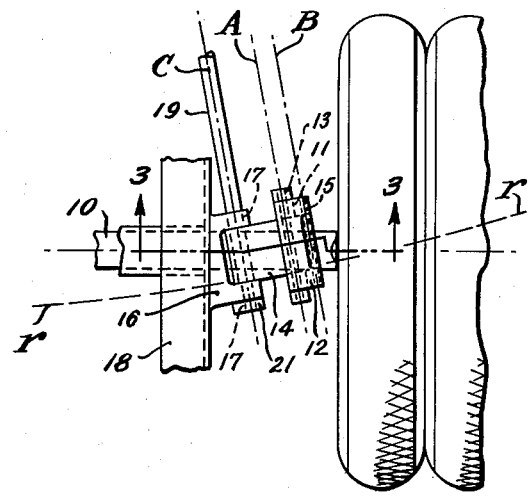
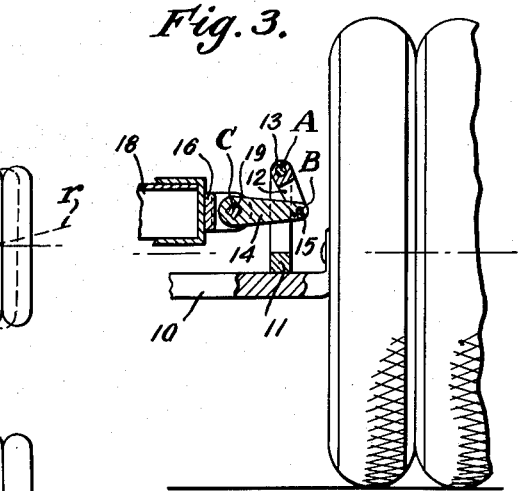
Inventor,
Charles W. McCutchen,
by Theodore C. Browne
Atty.

United States Patent Office 2,746,765
Patented May 22, 1956

2,746,765
SUSPENSION SYSTEMS FOR MOTOR ROAD VEHICLES

Charles W. McCutchen, Cambridge, England

Application December 8, 1954, Serial No. 473,923

Claims priority, application Great Britain January 14, 1954

2 Claims. (Cl. 280—124)

A common method of springing and suspending a truck or trailer chassis when dual axles are used is the so-called "torsion bar tandem suspension system." Essentially this system suspends the load from an axle bracket located near the end of each axle by means of a depending shackle pivoted to a crank, which in turn is pivoted to a bracket rigidly affixed to the frame of the vehicle. The axes of all of the pivots in the suspension at one end of the axle lie parallel to each other. The resilient element of the suspension is a torque rod rigidly secured to the crank, to the forward end of which a gear journaled in a cross-member of the chassis is affixed. The torque rod gear mates with the terminal gear of the torque rod located on the same side of the vehicle and which extends from the other of the pair of axles.

Raising any wheel of the pair twists the torque rod and, because of the gearing, produces an opposite twist on the rod leading to the other axle. Thus, although the wheels may rise and fall with the irregularities in the road surface, the load on the front and rear wheels remains equalized.

Springing, or the degree to which the crank is normally lifted by the torque rod, is secured by the initial setting given to the rod. Since the pivot point at the outer end of the crank lies beyond and below the pivot point on the axle bracket, the weight of the vehicle tends to center the axle transversely with respect to the vehicle axis.

The axle and frame brackets are set at an angle to the axis of the frame (approximately 7°) and incline inwardly toward the forward end of the vehicle. This arrangement is intended to allow the free lateral shift or floating of the axles and permits the axles to trail or self-steer on turns of 240 feet or greater radius.

Such suspension systems are known in the art as "torsion bar tandem suspension systems." For brevity and convenience in the specification and the claims, I shall adopt this terminology and intend the words to refer to a torsion bar suspension system which includes the elements and incorporates the general arrangement which has been described above.

Vehicles so sprung have run up extraordinary performance records and generally have been satisfactory. Nevertheless, certain hitherto unexplained failures occur. Axle or suspension failure, particularly when the vehicle is a heavy tank trailer loaded with petroleum products, can become a serious highway disaster. Its cause demands rigid investigation.

As a result of my investigations of certain failures which occurred on the highways in France and in the United States, I determined that the parallelism of all of the axes of support caused a twisting or wringing motion to be imparted to the suspension system, the axle, and the frame whenever the axle was displaced horizontally or rotated about the longitudinal axis.

I explain the generally good performance by the fact that the frame, the axle, and the support assemblies twist and that the degree of deflection is normally well within the elastic limit of the steel parts. This deflection is not, however, without harmful effects, some of which are as follows:

Extra stress on pivots causes premature bearing wear, which coupled with the misalignment inherent in the system, occasionally results in seizure of the pivot bearings invariably in the full up or down position. Extra stress on the suspension parts and the chassis will at best accelerate any fatiguing of the material and at the worst cause a failure. Furthermore, geometrical considerations show that the self-steering effect is reduced by whatever deflection of the axle is produced by the misalignment.

The object of this invention is to avoid any wringing or twisting of the parts in the suspension assembly, and consequently to eliminate strains imposed by such wringing motions on the axle and vehicle chassis.

I can best explain the means which I employ to avoid misalignment of the parts by the drawings.

Figure 1 is a top plan view of the suspension elements of a tandem system. (For clarity in illustration, the torque rods extending from the forward pair of axles have been broken off, and those of the rear axle are not shown. Also the angle of inclination of the suspension assemblies has been exaggerated.)

Figure 2 is a fragmentary top plan view of a right-hand suspension assembly.

Figure 3 is a vertical section of the assembly on the line 3—3 of Figure 2.

Referring to the figures, the part 10 represents one of the tandem axles. The suspension system comprises the axle brackets 11, which are rigidly affixed to the axle 10 and are oriented at an angle of about 7° to the axis of axle 10. Shackles 12 are pivoted to the axle brackets 11 by the shackle pivot pin 13. Crank 14 is pivoted to the lower end of the shackles 12 by the shackle-crank pivot pins 15. Crank 14 is also pivoted to the chassis brackets 16 at 17—17. The chassis brackets 16 are, in turn, rigidly fastened to the vehicle chassis 18. Torque rods 19 extend through the crank, and their ends are rigidly connected to the cranks by the crank end plate 21.

As the dash lines show, the axes of the pivots project toward a common meeting point 22. Specifically the axis A of the shackle-axle bracket pivot pins 13 projects from the right-hand bracket and from the left-hand bracket to meet at the point 22, the axis B of the shackle-crank pivot pin 15 projects from the right-hand crank pivot and the left-hand crank pivot to meet at the point 22, and the axis C of the crank-chassis pivot 17—17 projects from the right-hand and from the left-hand to meet at the point 22. In other words, the projected axes A, B, and C from each suspension system are radii of a sphere.

Thus, in each suspension assembly there are three pivot points:

The crank 14 may rotate about its chassis-crank pivot axis C. The shackle 12 may rotate about its crank-shackle pivot axis B, and it may also rotate about its shackle-axle bracket pivot axis A.

As was stated before, these axes are radii of a sphere, hence, no pivot axis is parallel to any other; but rather the projected axes A, B, and C converge to meet at a common point 22, the actual distance of which from the axis of axle 10 is determined by the angle of inclination to that axis of which axle bracket 11 has been set. (This is usually in the order of 7°.) The construction and orientation of the pivots on the opposite ends of the axle 10 are similar.

*Operation*

The operation of a suspension assembly when all of the axes of all of the pivots of a single axle are projected to meet at a common point is as follows:

Consider the suspension assembly as the axle 10 responds to irregularities in the road surface and assume that the axle is displaced upwardly lifting the crank 14. Crank 14, therefore, has rotated counterclockwise about the pivot axis C. As crank 14 rotates, the pivot axis B at its end, which is also the lower pivot axis of the shackle 12, remains pointing at the point 22; and irrespective of this motion, shackle 12 neither approaches nor recedes from point 22 but remains the same distance away from it because the triangle formed between axes A and B remains the same no matter how the crank 14 rotates in its bearing. The upper pivot axis A of the shackle 12 always remains directed along the axial projection, and pivot 13 remains a constant distance from the point 22 irrespective of the rotation of shackle 12 or of the crank 14. The same effect occurs on the left-hand side of the vehicle. The left-hand pivots remain pointing at point 22 and remain the same distance from point 22 irrespective of the degree of rotation of the various parts.

We may now assume that a vehicle suspended as the figures show makes an inside turn to the right. Due to the inclination of the axle brackets 11, the forward inside wheels move, as the dotted outlines in Figure 1 show, toward the vehicular axis, while the wheels at the opposite end of the axle move outwardly. At the same time, the axle 10 swings along the radius indicated by r—r, so that in the full self-steering position (if the inclination of the axle brackets is 7°), the axis of axle 10 lies along a 240-foot radius, while the vehicular axis remains tangent to the circle.

Since, in our consideration of the vertical motion of axle 10, it has already been demonstrated that all points remain on spheres of constant radius with centers at point 22, the self-steering response results in a combined translational and rotational motion of the axle 10, which is resolvable into simple rotation around point 22. The permissible freedoms are not independent.

It will be appreciated that the distinctive operational difference between my suspension system and those in prior use is this:

The point or points where freedom must exist if any motion is to be permitted are, in my system, carried outside of the suspension assembly and the axle and are found on ultimate analysis to lie between the vehicle tires and the roadway. Since these points always move when the vehicle moves, their motion imposes no strain which can result in the relative angular displacement of the parts of the suspension, the axle, or the vehicular assembly.

This will become more clear if we contrast this with prior systems. In these, the projected axes A, B, and C in the suspension assemblies lie parallel to each other. Then the axes cannot meet at a common point, but cross the vehicular axis in different planes at a succession of points. Let us consider such a tandem having its axles set 4 feet apart and in the full self-steering position (with a 7° toe-in, this occurs on a 240-foot radius curve). Each axle, to reach this position, must pivot 2/240 radians about the vertical axis. If there be no bump or centrifugal lean, then the axles remain in the same horizontal plane, and self-steering is accomplished by the horizontal motion of the axle.

If the axle pivots about the vertical axis, then the upper shackle axis pivots by the same amount; but this is impossible, since it is parallel to the lower shackle axis, which in turn is parallel to the crank axis, which is fixed with respect to the chassis. This motion wrenches the assembly. The maximum misalignment produced by lateral motion is thus 1/120 radian at each end, which must be distributed among the clearances of the three bearings with the remainder twisting the various parts.

I claim:

1. In a tandem axle vehicle spring suspension, which comprises a frame, two axles each having wheels journaled thereon, a suspension bracket adjacent the end of each axle having its axis of vehicle support angularly disposed to the axis of the vehicle, a frame bracket, a shackle pivoted to the axle suspension bracket, a crank pivoted to said shackle having its arm pivoted to the frame bracket and a torque rod rigidly affixed to the crank, that improvement which consists in projecting the pivot axes of each bracket, crank, and torque rod of each separate axle toward a common point of convergence located forwardly on the axis of said vehicle and remote from the axle, the distance between the point of convergence of the pivot axes of the first axle and the point of convergence of the pivot axes of the second axle being spaced on said vehicular axis at a distance which corresponds to the spacing between the tandem axles of said vehicle.

2. In a vehicle having a plurality of load bearing axles having axle suspension brackets, wheels journaled adjacent the extremities of said axles, a frame, frame suspension brackets rigidly affixed to said frame, cranks comprising journal and crank arm portions journaled in the frame suspension brackets, torque rods rigidly fastened to the cranks projecting along the axis of the journaled portion of said cranks, shackles pivoted adjacent the end of the crank arms and having their opposite ends pivoted to the axle suspension brackets, the axes of the cranks in the frame brackets, the shackle pivots of the crank arms, and the axle bracket—shackle pivots on both right and left side of the vehicle being radii of a sphere the center of which is located forwardly on the axis of said vehicle and remote from the axle, the center of convergence of the corresponding axes of a second axle lying on the vehicular axis but spaced from the first center at a distance corresponding to the spacing between the axles.

References Cited in the file of this patent

UNITED STATES PATENTS 2,361,166    Ayers ------------------ Oct. 24, 1944